Feb. 29, 1944.  E. PRINZ  2,342,892
GRATER FOR REMOVING AND FLAKING EDIBLE RINDS
Filed July 10, 1942
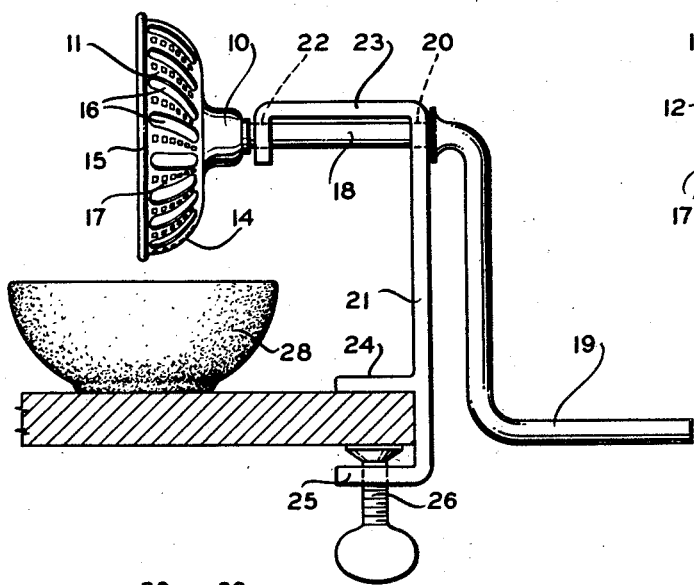
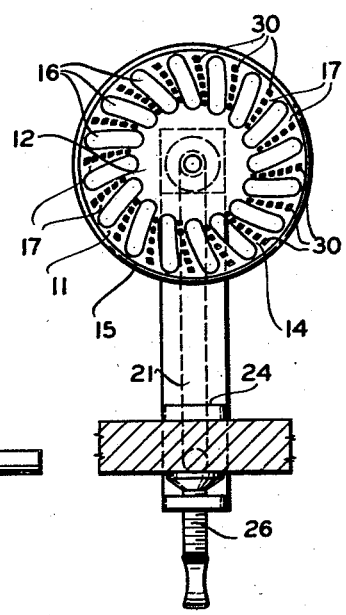
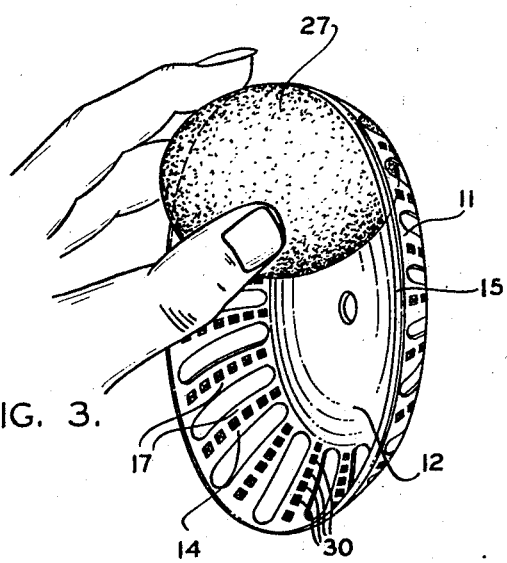
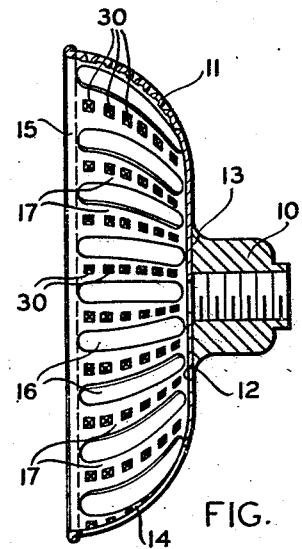
Inventor
EDWARD PRINZ Patented Feb. 29, 1944

2,342,892

UNITED STATES PATENT OFFICE 2,342,892

GRATER FOR REMOVING AND FLAKING EDIBLE RINDS

Edward Prinz, St. Paul, Minn.

Application July 10, 1942, Serial No. 450,447

3 Claims. (Cl. 146—177)

My invention relates to graters for removing and flaking edible rinds and has for its object to provide a simple and effective device for grating off flecks of the thickened rind of such fruits as oranges, lemons, grapefruit and the like.

It is well known that the thickened rind of oranges, lemons and grapefruit provides, in a flaked or grated form, an excellent condiment to be added to various dishes of cookery, as they carry certain oils and flavors not available from any other source. Hand graters of different types have been employed and also rotating graters exposing either a grating cylinder or a grating disc with a flat face against which the rind of the fruit is held to effect the grating removal thereof. A serious difficulty is encountered with all of these devices in that the flecks removed from the rind of the fruit by the grating members impact upon the face of the grating member, necessitating frequent and difficult cleaning off of the impacted rind particles. Furthermore, the surfaces employed on these devices are either flat or cylindrical, and the application of the fruit to the outside of these surfaces results in action upon a very small part of the fruit rind at any time and not only slows the whole operation, but tends to cut through in places to the inner pulp of the fruit.

It is an object of my invention, therefore, to eliminate these difficulties by providing a deeply concaved rotating surface which has in general a concaved curve corresponding to the convex curve of the fruit rind, whereby the grating members will act upon a considerable body of the fruit rind simultaneously and will have little tendency to cut through into the inner pulp of the fruit, which is always undesirable.

It is a further object of my invention to arrange the grating projections in curved arcs on the inner face of the concaved grater member, which are spaced apart considerable distances with curved slots between each pair of said grater members. These slots have the effect of causing the flecks of rind removed from the fruit to be thrown off of the grater, thus avoiding the necessity of frequently stopping the grating operation to remove the impacted material from the face of the grater.

It is a further object of my invention to provide the above-noted features in conjunction with a simple, effective and economical arrangement for clamping the device to the edge of a table or other board, where it may be used to the greatest advantage.

The full objects and advantages of my invention will appear in connection with the detailed description thereof, and the novel features by means of which the aforesaid advantageous results are obtained will be particularly pointed out in the claims.

In the drawing, illustrating an application of my invention in one form:

Fig. 1 is a side elevation view of a grater, embodying my invention, showing the same attached to a table.

Fig. 2 is a similar front elevation view.

Fig. 3 is a perspective view of the grater head dissociated from the rest of the machine, showing the manner of applying a fruit such as a lemon, to the grater.

Fig. 4 is a sectional side elevation view taken across the grater head.

Fig. 5 is an enlarged detail view of a form of grater member employed.

As illustrated, the grater comprises a head base 10 to which is attached a deeply concaved grater member 11 which may be formed of sheet metal as shown. This grater member 11 includes a flat bottom portion 12 secured as indicated at 13 to the head base 10. From the bottom portion or plate 12 there extends outwardly the curved portion 14 running into a surrounding rim 15. Extending in broad arcs from the bottom plate 12 just inside of the rim 15, are a series of slots 16 curved in broad arcs and extending along the curved portion 14 of the grater member 11. As best shown in Fig. 2, it will be noted that these slots are not formed radially with reference to the axis of rotation of the grater member, but extend at a considerable angle to the radii of said axis of rotation.

These slots are spaced substantial distances apart leaving between them strips of metal 17 as clearly shown in most of the figures of the drawing. These strips 17 have formed therein lines of grater teeth 30 punched inwardly as indicated in an enlarged detail in Fig. 5. The grater member as a whole therefore, comprises lines of grater projections extending in the metal between slots, both of these lines of projections and the slots being curved in broad arcs and extending at an angle to the radii going through the center of rotation of the grater as a whole.

The grater head 10 has secured thereto a shaft 18 formed in conjunction with a crank arm 19, Fig. 1. The shaft 18 extends through an opening 20 in a vertical bracket arm 21 and an opening 22 in a depending flange extending from a right-angled portion 23 of the bracket arm 21. The main supporting bracket arm 21 is provided with clamping flanges 24 and 25, which with the aid of a clamping screw 26, enables the device to be readily clamped upon an edge of a table or other supporting board.

In operation, assuming the parts to be in the position of Figs. 1 and 2, the grater member 11 is rotated at any desired speed by means of the crank handle 19. As it is rotated, the rind of a fruit such as indicated at 27, Fig. 3, will be held inside of the grater member with the rind contacting the inside of the curved portion 14, so that the lines of inwardly punched grater teeth 30 will progressively engage portions of the rind, thus progressively tearing away fragments of the rind which are projected through the slots 16 outwardly and downwardly to be received in any receptacle such as is indicated at 28 in Fig. 1.

The advantages of my invention will quite clearly appear from the above statement of its structure and mode of operation. The action of the obliquely disposed lines of grater teeth projecting inwardly into what is in effect a rapidly moving curved trough of the grater member 11, is to disintegrate portions of the rind in successive small flakes or flecks, and to discharge them through the slots 16. This not only produces a much superior form of shredding or flaking of the grated rind, but prevents its impacting into cakes or slabs on the face of the grater member. This obviates a serious defect in other rotating grating devices wherein these slabs not only take up a lot of time for removal, but present the grated rind in chunks and masses that are difficult to disintegrate for use. On the other hand, the flakes thrown down by my grater will be free from impacting or massing and will go into whatever dish of cookery they are used with in a flocculent and highly useable condition.

I claim:

1. A grater comprising a deeply dished grater head with grater teeth projected inwardly along the curved inner face of the head, said inner face being provided with slots or openings extending in curved lines at angles to the radii extending through the axis of rotation of the head, and means for rotating said head, whereby the convex contour of the rind of a fruit such as oranges or lemons will be presented to the concaved rotating surface of the grater member.

2. A grater comprising a deeply dished circular grater head with grater teeth projected inwardly along the curved inner face of the head, said teeth being arranged in curved lines at angles to the radii extending through the axis of rotation of the head, said inner face being provided with slots or openings between lines of grater teeth, and means for rotating said head, whereby the convex contour of the rind of a fruit such as oranges or lemons will be presented to the concaved rotating surface of the grater member and the flakes grated from the rind will be thrown off through the slots.

3. A grater comprising a deeply dished circular grater head, a horizontal shaft suporting said grater head for rotation in a vertical plane, a crank for rotating the grater head in that plane, grater teeth projected inwardly along the curved inner face of the head, said grater teeth being arranged in successive spaced rows, and a series of elongated slots corresponding in number to the rows of grater teeth positioned between each pair of said rows, whereby when the grater head is rotated the convex contour of the rind of a fruit such as oranges or lemons will be presented to the concaved rotating surface of the grater member and the flakes grated from the rind will be thrown off and down through the slots.

EDWARD PRINZ.